(12) United States Patent
Toutant et al.

(10) Patent No.: US 7,274,702 B2
(45) Date of Patent: Sep. 25, 2007

(54) PROGRAMMABLE INTERCONNECT SYSTEM FOR SCALABLE ROUTER

(75) Inventors: René Toutant, Montreal (CA); Karen Hermann, Montreal (CA); Sylvain Labonté, St-Bruno de Montarville (CA); Alain Beauchamp, Bellefeuilles (CA)

(73) Assignee: 4198638 Canada Inc., St-Laurent, Quebec (CA)

( * ) Notice: Subject to any disclaimer, the term of this patent is extended or adjusted under 35 U.S.C. 154(b) by 848 days.

(21) Appl. No.: 09/994,017

(22) Filed: Nov. 27, 2001

(65) Prior Publication Data

US 2003/0099247 A1  May 29, 2003

(51) Int. Cl.
*H04L 12/28* (2006.01)

(52) U.S. Cl. ...................... 370/400; 370/465
(58) Field of Classification Search ............... 370/400, 370/401, 465
See application file for complete search history.

(56) References Cited

U.S. PATENT DOCUMENTS

| | | | |
|---|---|---|---|
| 5,461,624 A | 10/1995 | Mazzola | |
| 5,526,352 A | 6/1996 | Min et al. | |
| 5,541,914 A | 7/1996 | Krishnamoorthy et al. | |
| 5,598,408 A | 1/1997 | Nickolls et al. | |
| 5,892,932 A * | 4/1999 | Kim | 710/316 |
| 6,044,080 A | 3/2000 | Antonov | |
| 6,058,116 A * | 5/2000 | Hiscock et al. | 370/401 |
| 6,205,532 B1 | 3/2001 | Carvey et al. | |
| 6,285,679 B1 | 9/2001 | Dally et al. | |
| 6,522,646 B1 * | 2/2003 | Madonna | 370/353 |
| 6,826,195 B1 * | 11/2004 | Nikolich et al. | 370/465 |
| 6,870,813 B1 * | 3/2005 | Raza et al. | 370/238 |
| 6,898,205 B1 * | 5/2005 | Chaskar et al. | 370/450 |
| 2002/0150056 A1 * | 10/2002 | Abadi et al. | 370/256 |
| 2006/0007946 A1 * | 1/2006 | Kastenholz et al. | 370/401 |

OTHER PUBLICATIONS

Switch Clusterings: A Breakthrough for Scalable and Affordable LANs; Cisco Systems; 2001 Cisco Systems, Inc. pp. 1 to 6; http://www.cisco.com.; retrived Sep. 20, 2001.

Multi-Purpose Client-Programmable Routers; Link Interface Node for External Systems; Interface Concept; http://ww.interfaceconcept.com; retrieved Sep. 20, 2001.

Optical Fiber Interconnection for the Scalable Parallel Computing System; Ge Zhou, Yimo Zhang and Wei Liu; Proceedings of the IEEE, vol. 88, No. 6, Jun. 2000.

(Continued)

*Primary Examiner*—Hassan Kizou
*Assistant Examiner*—Anthony Sol

(57) ABSTRACT

The invention provides a chassis, a scalable router that includes a plurality of chassis and a method of upgrading a router. Each chassis includes a plurality of processing modules and a programmable interconnection module. Data connections are provided between each processing module on each chassis and the interconnection module on that chassis, and a data connection is provided between the interconnection module on each chassis and the interconnection module on at least one other chassis. In this way, the inter-chassis and intra-chassis connections pass through the programmable interconnection module, which may be used for concentrating the location of resources, such as optoelectronic and electro-optical converters, in a single card or unit. Moreover, the programmable nature of the switch fabric in each interconnection module is amenable to reconfiguration so as to support a change in that chassis' interconnection pattern that may be required for expanding the router's capacity.

35 Claims, 12 Drawing Sheets

OTHER PUBLICATIONS

Design of Giga-Bit/s Optical Interconnection Network for Computer Cluster; Ge Zhou, Wen-Cal Jing, Yi-Mo Zhanbg, Feng Hua, Jin-Dong Tian, Yian-Ling Chen and Wei Liu; College of Precision Instrument and-Opto-electronic Engineering; 1998 IEEE; pp. 194 to 199.

0.95—3.125 Gbps 140×140-Lane, Multi-Rate Space Switch with Clock and Data Recovery at Each Serial Input; Velio Communications, Inc.; 2001; pp. 1 to 36.

Gigabit Switch Using Free-Space and Parallel Optical Data Links for a PCI-Based Workstation Cluster; J. Ekman, P. Chandramani, P. Guy, X. Wang, F. Kiamilev; 2000 IEEE; pp. 494 and 495.

A complete Sub-System of Parallel Optical Interconnects for Telecom Applications; M. Niburg, P. Eriksen; K. Gustafsson, H. Hesselbom. G. Palmskog, M. Robertsson, N. Tan, K. Akermark, A. Djupsjobacka; Ericsson Components AB, Microelectronics Division, Corporate Research Centra; 1996 Electronic Components and Technology Conference; 1996 IEEE.

Optical Interconnects in Parallel Computer RWC-1; Junichi Shimada; RWCP Research Institute; 1999 IEEE pp. 2 and 3.

Parallel Optical Network Interconnects; A.F.J. Levi; University of Southern California; 1999 IEEE; pp. 693 and 694.

* cited by examiner

PROGRAMMABLE INTERCONNECT SYSTEM FOR SCALABLE ROUTER

FIELD OF THE INVENTION

The present invention relates to internetworking routers and, more particularly, to high-capacity routers having multiple interconnected chassis.

BACKGROUND OF THE INVENTION

Ever-increasing usage of the Internet is expected to lead to even higher demands on the capacity of Internet routers than those which already persist today. However, the rate of growth of traffic through a given Web site or traffic point in the Internet may vary considerably amongst different Internet Service Providers (ISPs). In some cases, the growth may be sudden and staggering, requiring huge increases in capacity on an almost instantaneous basis. In other cases, an anticipated increase in capacity might still be some time away, although a router with a basic switching capacity may need to be purchased immediately in order to satisfy an existing demand.

A conventional approach to upgrading the routing capacity through a given traffic point is to simply replace the existing router with a new, higher-capacity device. The old router is either decommissioned or relegated to a less traffic-intensive area of the ISP's internal network. Unfortunately, this approach requires a significant capital expenditure on the part of the ISP, since higher-capacity routers tend to be disproportionately more expensive than lower-capacity routers. Moreover, a capital expenditure of this nature is necessitated each time a capacity increase is required or desired. Additional disadvantages include the "down time" associated with installation of a new router, testing of new connections, changing suppliers and so on.

Clearly, it would be advantageous to provide a scalable solution to the problem of accommodating traffic growth through a router. However, as now described, conventional router design makes this a near impossible feat. Specifically, a scalable router typically has two or more chassis, each of which contains multiple switch cards and line cards. The line cards have ports for interfacing with an external network. Internally to the router, the switch cards are connected to the line cards and to one another by a backplane on each chassis, and by direct interconnections across multiple chassis.

In order to enhance the available switching capacity of the router, it may appear plausible to add one or more extra chassis but it should also be apparent that these additional chassis must somehow be connected to the existing chassis. As a result, existing hardware connections, both within and between he existing chassis, must be disconnected and then re-connected according to a different inter-chassis topology and a different intra-chassis interconnect pattern. Thus, while avoiding part of the capital expenditure associated with an outright replacement of the existing router, the conventional solution has the disadvantage of requiring added installation and testing efforts, both of which are labour-intensive and prone to error.

Hence, there remains a strong need in the industry to provide a scalable router that would be designed to accommodate changes in capacity without requiring replacement or disconnection of the existing inter-chassis or intra-chassis connection hardware.

SUMMARY OF THE INVENTION

The present invention endeavours to obviate or mitigate one or more disadvantages of the prior art and may be summarized according to a first broad aspect as a router that includes a plurality of chassis, each chassis including a plurality of processing modules and a programmable interconnection module. Data connections are provided between each processing module on each chassis and the interconnection module on that chassis, and a data connection is provided between the interconnection module on each chassis and the interconnection module on at least one other chassis.

In one specific embodiment, the data connections between the processing modules on each chassis and the interconnection module on that chassis are electrical and the data connections between the interconnection modules on different chassis are optical.

In another specific embodiment, the interconnection module on each chassis includes a plurality of electrical input ports, a plurality of electrical output ports and a programmable switch fabric disposed therebetween, for providing selective connections between individual ones of the electrical input ports and corresponding ones of the electrical output ports. Additionally, each processing module on each chassis includes a plurality of electrical input ports, a plurality of electrical output ports and a processing fabric disposed therebetween. Moreover, the plurality of electrical input ports of each processing module on each chassis is connected to a respective subset of the electrical output ports of the interconnection module on that chassis, while the plurality of electrical output ports of each processing module on each chassis is connected to a respective subset of the electrical input ports of the interconnection module on that chassis.

In this way, the inter-chassis and intra-chassis connections pass through the programmable interconnection module, which may be used for concentrating the location of resources, such as opto-electronic and electro-optical converters, in a single card or unit. Moreover, the programmable nature of the switch fabric in each interconnection module is amenable to reconfiguration so as to support a change in that chassis' interconnection pattern that may be required for expanding the router's capacity.

According to a second broad aspect, the present invention may be summarized as a chassis for use in building a scalable router. The chassis includes a plurality of processing modules, each processing module including a plurality of electrical input ports, a plurality of electrical output ports and a processing fabric disposed therebetween. The chassis also includes a programmable interconnection module, including a plurality of electrical input ports, a plurality of electrical output ports and a programmable switch fabric disposed therebetween, for selectively establishing connections between individual ones of the electrical input ports and corresponding ones of the electrical output ports in accordance with a connection map.

A data connection is established between each processing module and the interconnection module, whereby a subset of the plurality of electrical input ports of each processing module on each chassis is connected to a respective subset of the electrical output ports of the interconnection module on that chassis and whereby a subset of the plurality of electrical output ports of each processing module on each chassis is connected to a respective subset of the electrical input ports of the interconnection module on that chassis.

The chassis additionally includes a plurality of optical input ports and a plurality of optical output ports, for external connection to one or more other chassis of the router. The chassis also has a plurality of optical-to-electrical conversion units, each optical-to-electrical conversion unit being connected between a respective one of the optical input ports and a respective subset of the electrical input ports of the interconnection module. Finally, the chassis includes a plurality of electrical-to-optical conversion units, each electrical-to-optical conversion unit being connected between a respective subset of the electrical output ports of the interconnection module and a respective one of the optical output ports.

According to a third broad aspect, the present invention may be summarized as a method of upgrading a router including a plurality of original chassis, each original chassis having a plurality of processing modules and a programmable interconnection module, wherein a data connection exists between each processing module on each original chassis and the interconnection module on the same original chassis and wherein a data connection exists between the interconnection module on each original chassis and the interconnection module on at least one other original chassis. The method includes providing at least one additional chassis, each additional chassis comprising a plurality of processing modules and a programmable interconnection module, wherein a data connection exists between each processing module on each additional chassis and the interconnection module on the same additional chassis. The method then includes establishing a data connection between the interconnection module on each additional chassis and the interconnection module on at least one original chassis, and establishing a data connection between the interconnection module on each additional chassis and the interconnection module on at least one other additional chassis. Finally, the interconnection modules of the various original chassis are reprogrammed. The interconnection modules of the various additional chassis can be programmed prior to, or after, their connection to the original chassis.

These and other aspects and features of the present invention will now become apparent to those of ordinary skill in the art upon review of the following description of specific embodiments of the invention in conjunction with the accompanying drawings.

DETAILED DESCRIPTION OF THE PREFERRED EMBODIMENTS

Figure 1:
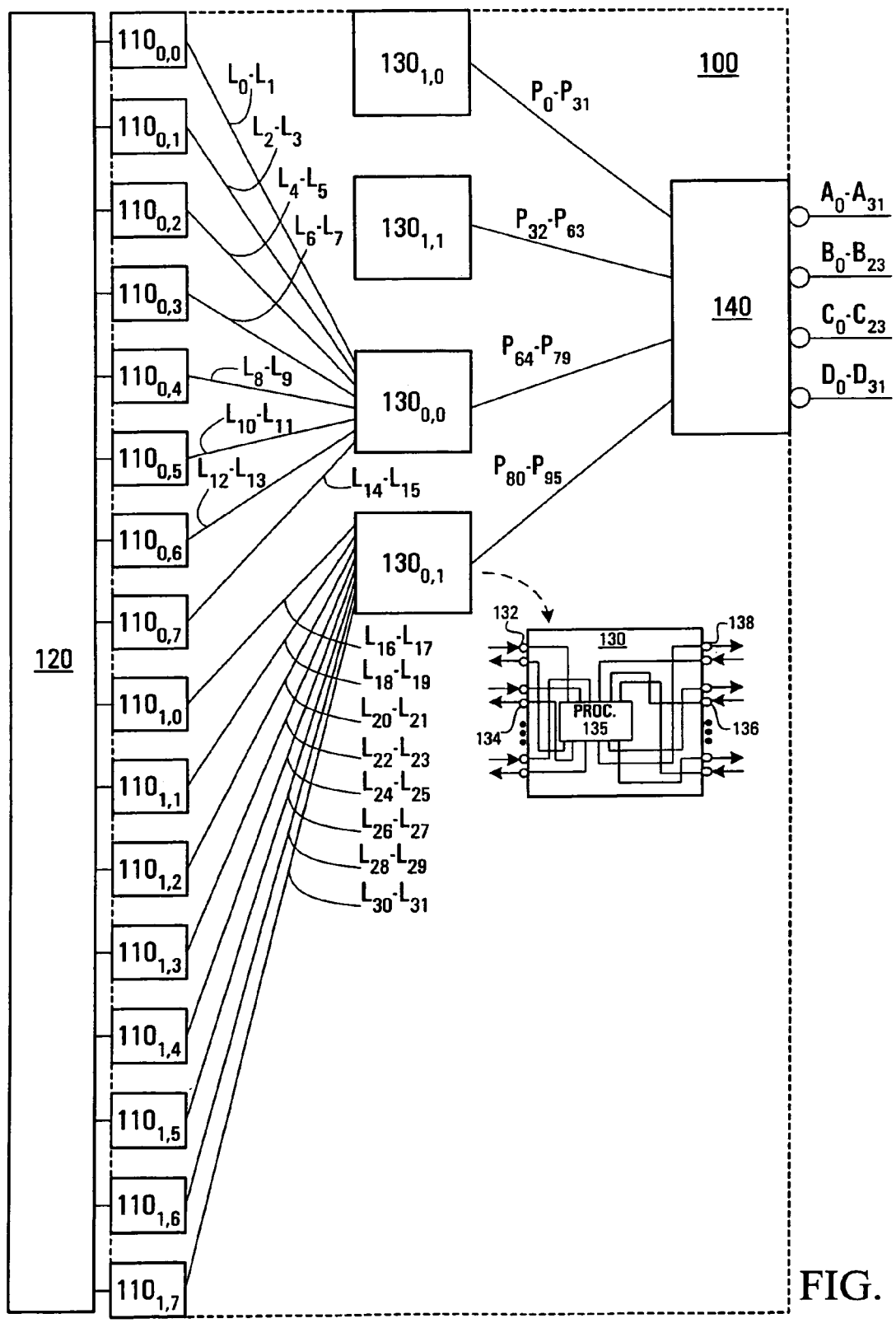
FIG. 1 depicts an interconnect pattern existing within a chassis in accordance with an embodiment of the present invention.

With reference to FIG. 1, there is shown a chassis (shelf) 100, and more specifically a data interconnect pattern within the chassis 100, according to an embodiment of the present invention. Two or more chassis 100 of the type shown in FIG. 1 may be used to build a router, in a manner to be described later on with reference to FIGS. 3A through 5B. The chassis 100 includes a plurality of line cards 110 for interfacing with an external network 120, a plurality of processing cards 130 for providing processing and switching power, and an interconnection module 140.

The line cards 110 provide an optical or electrical interface to the network 120. Data in the form of packets (or ATM cells or SONET frames or the like) are exchanged with the network 120 via the line cards 110. In a specific non-limiting example embodiment, the line cards 110 may be implemented as disclosed in U.S. patent application Ser. No. 09/870,766 to Norman et al., filed on Jun. 1, 2001 and hereby incorporated by reference herein. In the embodiment illustrated in FIG. 1, the line cards 110 are equipped with bi-directional functionality. In other embodiments, some of the line cards 110 may be input line cards (for receiving packets from the network 120), while other ones of the line cards 110 may be output line cards (for transmitting packets to the network 120).

The total number of line cards 110 in the illustrated embodiment is sixteen, each of which may be inserted into a corresponding slot (not shown) of the chassis 100. The sixteen line cards 110 are grouped into two sets denoted more precisely as $110_{0,0}$-$110_{0,7}$ (set 0) and $110_{1,0}$-$110_{1,7}$ (set 1). Each of the line cards 110 has a set of ports used for establishing one or more full-duplex electrical paths with a corresponding one of the processing cards 130. By way of example, each of the line cards 110 may have four ports for establishing two full-duplex 2.5 Gbps (in each direction) electrical paths with a corresponding one of the processing cards 130. It should be understood, however, that the present invention is not limited to a specific number of line cards 110 or to a specific number of ports or paths per line card or to a specific path bandwidth.

The total number of processing cards 130 in the chassis 100 of the illustrated embodiment is four, each of which may be inserted into a corresponding slot (not shown) of the chassis 100. The four processing cards 130 include a set of two first-stage processing cards (denoted $130_{0,0}$ and $130_{0,1}$) and a set of two second-stage processing cards (denoted $130_{1,0}$ and $130_{1,1}$). Each of the first-stage processing cards includes a set of line-side ports for establishing sixteen full-duplex electrical paths L with a corresponding set of the line cards 110. Each of the first- and second-stage processing cards 130 includes a set of switch-side ports for establishing either sixteen (first-stage) or thirty-two (second-stage) full-duplex electrical paths P with the interconnection module 140.

As shown in FIG. 1, the line-side ports of each of the first- and second-stage processing cards 130 include a set of line-side input ports 132 and a set of line-side output ports 134. Similarly, the switch-side ports of each of the first- and second-stage processing cards 130 include a set of switch-side input ports 136 and a set of switch-side output ports 138. Additionally, each of the first- and second-stage processing cards 130 has a a processing fabric 135, such as a switch fabric, connected between the input ports 132, 136 and the output ports 134, 138. In a specific non-limiting example embodiment, the processing cards 130 may be implemented as disclosed in U.S. patent application Ser. No. 09/870,766 to Norman et al., filed on Jun. 1, 2001 and hereby incorporated by reference herein.

The paths L joining the line cards 110 and the processing cards 130 may be established through the use of a backplane or midplane configuration. In the illustrated embodiment, these paths are denoted $L_0$-$L_{31}$, where, for the line cards $110_{0,0}$ to $110_{0,7}$ in set 0, paths $L_0$-$L_1$ are established between line card $110_{0,0}$ and processing card $130_{0,0}$, paths $L_2$-$L_3$ are established between line card $110_{0,1}$ and processing card $130_{0,0}$, paths $L_4$-$L_5$ are established between line card $110_{0,2}$ and processing card $130_{0,0}$, paths $L_6$-$L_7$ are established between line card $110_{0,3}$ and processing card $130_{0,0}$, paths $L_8$-$L_9$ are established between line card $110_{0,4}$ and processing card $130_{0,0}$, paths $L_{10}$-$L_{11}$ are established between line card $110_{0,5}$ and processing card $130_{0,0}$, paths $L_{12}$-$L_{13}$ are established between line card $110_{0,6}$ and processing card $130_{0,0}$ and paths $L_{14}$-$L_{15}$ are established between line card $110_{0,7}$ and processing card $130_{0,0}$. A similar interconnect pattern joins the line cards $110_{1,0}$ to $110_{1,7}$ in set 1 to processing card $130_{0,1}$.

The paths P joining the processing cards 130 to the interconnection module 140 may also be established through the use of a backplane or midplane configuration. In the illustrated embodiment, there are ninety-six such paths and these are denoted $P_0$-$P_{95}$, where paths $P_0$-$P_{31}$ are established between processing card $130_{1,0}$ and the interconnection module 140, paths $P_{32}$-$P_{63}$ are established between processing card $130_{1,1}$ and the interconnection module 140, paths $P_{64}$-$P_{79}$ are established between processing card $130_{0,0}$ and the interconnection module 140 and paths $P_{80}$-$P_{95}$ are established between processing card $130_{0,1}$ and the interconnection module 140.

Due to the fact that all first- and second-stage processing cards 130 are connected to the interconnection module 140, data arriving from the network 120 can be processed by one or several processing cards 130 in sequence. For example, data can be routed back into the network 120 after reaching one of the first-stage processing cards $130_{0,0}$, $130_{0,1}$ or it can be forwarded to one of the second-stage processing cards $130_{1,0}$, $130_{1,1}$ via the interconnection module 140. In another embodiment of the invention, the entire set of line cards 110 could be connected to the entire set of processing cards 130, obviating a need for the distinction between "first-stage" and "second-stage" processing cards. Although the processing cards 130 are shown in FIG. 1 to be mutually non-interconnected, those skilled in the art should appreciate that it is within the scope of the present invention to provide additional data paths between pairs of processing cards 130. This may be advantageous when implementing a hypercube-based interconnect pattern, for example.

It should be understood that the present invention is not limited to any particular number of processing cards 130, nor to any particular number of stages of processing cards 130, nor to any particular number of line-side ports or switch-side ports per processing card 130, nor to any particular interconnection pattern between the processing cards 130 and the interconnection module 140, nor to any particular implementation for achieving a connection between the processing cards 130 and either the line cards 110 or the interconnection module 140.

The interconnection module 140 may be a separate card in the chassis 100 and includes a plurality of switch-side ports that establish paths $P_0$-$P_{95}$ with the switch-side ports of the processing cards 130. The interconnection module 140 further includes a plurality of optical ports A, B, C, D for establishing a plurality of full-duplex optical paths with the external world (i.e., with optical ports of other chassis of the router, to be described later on with reference to FIGS. 3A to 5B). In the illustrated embodiment, optical port A establishes 32 optical paths denoted $A_0$-$A_{31}$, optical port B establishes 24 optical paths denoted $B_0$-$B_{23}$, optical port C establishes 24 optical paths denoted $C_0$-$C_{23}$, and optical port D establishes 32 optical paths denoted $D_0$-$D_{31}$. However, it is to be understood that the present invention limits neither the number of optical ports nor the number of paths per optical port.

The internal structure and functionality of the interconnection module 140 are now described with reference to FIG. 2. Paths $P_0$-$P_{95}$, which join the interconnection module 140 to the processing cards 130, are connected to electrical interfaces of a programmable switch fabric 200. More specifically, since each of the ninety-six paths $P_0$-$P_{95}$ is full-duplex, they are connected to ninety-six input electrical interfaces (denoted $IN_0$-$IN_{95}$) and ninety-six output electrical interfaces (denoted $OUT_0$-$OUT_{95}$) of the switch fabric 200.

In addition, a set of 112 additional input electrical interfaces (denoted $IN_{96}$-$IN_{207}$) lead from the optical ports A, B, C, D via a bank of opto-electronic receivers 210, while a set of 112 additional output electrical interfaces (denoted $OUT_{96}$-$OUT_{207}$) lead to the optical ports A, B, C, D via a bank of electro-optical transmitters 220. More specifically, electrical interfaces $IN_{96}$-$IN_{127}$ and $OUT_{96}$-$OUT_{127}$ are associated with optical paths $A_0$-$A_{31}$, electrical interfaces $IN_{128}$-$IN_{151}$ and $OUT_{128}$-$OUT_{151}$ are associated with optical paths $B_0$-$B_{23}$, electrical interfaces $IN_{152}$-$IN_{175}$ and $OUT_{152}$-$OUT_{175}$ are associated with optical paths $C_0$-$C_{23}$, and electrical interfaces $IN_{176}$-$IN_{207}$ and $OUT_{176}$-$OUT_{207}$ are associated with optical paths $D_0$-$D_{31}$.

Thus, by virtue of its input electrical interfaces $IN_0$-$IN_{207}$, the switch fabric 200 can be on the receiving end of up to a total of 96 electrical data signals from the processing cards 130 and a further 112 electrical data signals from other chassis (via the optical ports A, B, C, D), for a total of 208 received electrical signals. Similarly, by virtue of its output electrical interfaces $OUT_0$-$OUT_{207}$, the switch fabric 200 can transmit up to a total of 96 electrical data signals to the processing cards 130 and a further 112 electrical data paths to other chassis (via the optical ports A, B, C, D), for a total of 208 transmitted electrical signals.

In order to accommodate the switching requirement of the switch fabric 200, the latter may be implemented as a single, non-blocking cross-point switch matrix of the requisite size (208×208). This would allow any of the electrical paths $P_0$-$P_{95}$ to be connected to any of the optical paths $A_0$-$A_{31}$, $B_0$-$B_{23}$, $C_0$-$C_{23}$, and $D_0$-$D_{31}$. However, it is noted that not all of the electrical signals received from the opto-electronic receivers 210 will need to be relayed to the processing cards 130. Rather, some of these may need to be immediately re-routed back to the optical ports via the electro-optical transmitters 220. Similarly, some of the electrical signals received from the processing cards 130 will need to be immediately re-routed back to the processing cards 130, although possibly to a different processing card than the one it originated from. Both of these types of immediate re-routing functionality can be referred to as "loopback" functionality.

Figure 2:
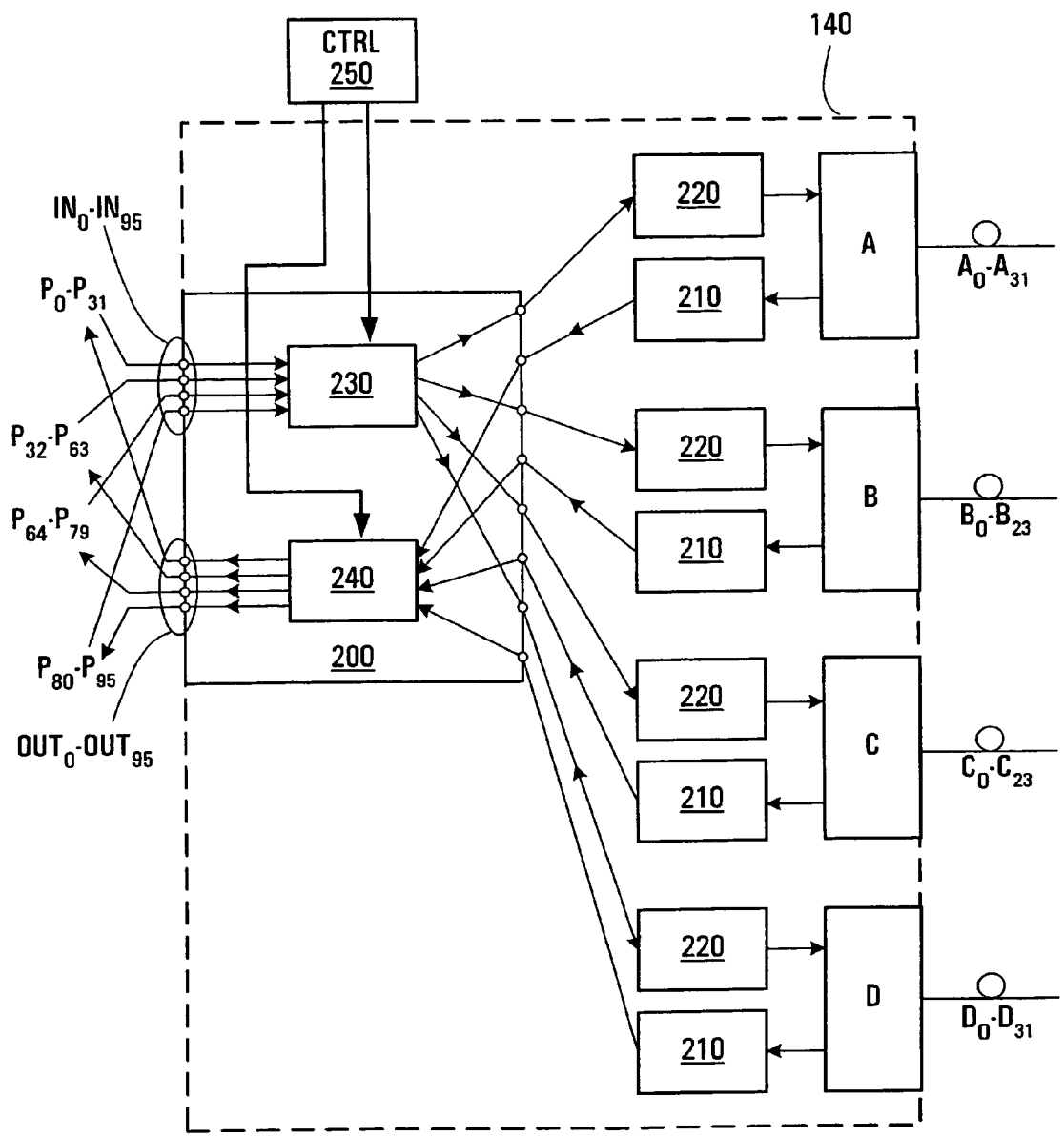
FIG. 2 illustrates an example of the internal structure of an interconnection module in the chassis of FIG. 1.

As a result of this requirement for some degree of loopback functionality, the switch fabric 200 can be constructed from two or more interconnected cross-point switches of smaller dimensionality, as illustrated in FIG. 2. Specifically, switch 230 takes care of switching a subset of 96 electrical signals (from the processing cards 130 to the external world), while switch 240 takes care of switching a subset of 112 electrical signals (from the external world to the processing cards 130). Loopback functionality is made possible through an interconnection of a relatively small number of connections, in this case twenty-eight (28), between the two cross-point switches 230, 240.

Hence, the requisite functionality of a massive 208×208 switch fabric 200 can be attained using one 124×124 switch matrix (where 124=96+28) and one 140×140 switch matrix (where 140=112+28). In some circumstances, it may be advantageous to over-provision slightly and use two identical switch matrices, which in this case translates into a requirement for two 140×140 cross-point switch matrices. Cross-point switches of this magnitude are available from Velio Semiconductor Corp. as part number VC 3003. Of course, other variations are possible, especially with respect to the number of input and output ports on each of the cross-point switches 230, 240 and the number of intra-fabric connections provided for loopback purposes. It should be appreciated that signal conditioning functionality (e.g., regeneration and re-timing) may additionally be provided within the switch fabric 200 or in connection therewith.

When signal conditioning is performed at the periphery of the switch fabric 200, this may be achieved through the use of a dedicated signal conditioning module.

It should also be mentioned at this point that if the signals being handled by the chassis 100 need to remain in an optical form throughout their journey through the chassis 100, MEMS (micro-electro-mechanical switch) devices or the like may be used in the switch fabric 200 instead of the cross-point switches 230, 240. This may also require signal conditioning, albeit of a different type (e.g., re-timing and possibly multi-mode to single-mode conversion or vice-versa).

The connection map applied by the switch fabric 200 is controlled by a controller 250, which may be embodied as a microprocessor, FPGA, EEPROM, etc. The format of the connection map output by the controller 250 will, of course, depend on the internal structure of the switch fabric 200. In the case of the illustrated embodiment, the controller 250 would be responsible for providing two 140×140 connection maps, one to each of the cross-point switches 230, 240. By changing the content of the connection maps, the controller 250 can change the mutual interconnection of the processor cards 130 within the chassis 100 and also the interconnection defined between the processor cards 130 in the chassis 100 and the external world relative to the chassis, which includes other chassis in a multi-chassis configuration.

The controller 250 may be located in the chassis 100 itself, either on a separate controller card or on the interconnection module 140. The controller 250 may be accessed through the backplane via a dedicated external communication channel or it may be accessed through one of the line cards 110 via one of the paths $P_{64}$-$P_{95}$. The controller 250 may be responsive to instructions transmitted via a modem or other interface device (e.g., a communications adapter) connected over a transmission medium such as a tangible medium (e.g., optical or analog communications lines) or a medium implemented using wireless techniques (e.g., microwave, infrared or other transmission schemes).

As previously mentioned, a router may be built from two or more identical chassis 100 of the type illustrated in FIG. 1. The chassis are interconnected to one another via their interconnect modules' optical ports in accordance with an inter-chassis topology. Each full-duplex optical path travelling between optical ports may be carried on two separate optical fibers or on separate wavelengths of the same fiber or in any other suitable way known to those of ordinary skill in the art. Many inter-chassis topologies are within the scope of the present invention. In some topologies, it is desired to mesh all the chassis using the available optical ports. In other topologies, multiple chassis may be connected in a ring- or star-like configuration. In still other topologies, the chosen interconnect strategy will seek to keep the maximum number of "hops" between chassis to below a given upper bound.

In either case, the router so created can be upgraded by simply adding one or more supplementary chassis to the existing group of chassis, adding new interconnections between previously idle optical ports and re-programming the interconnection modules 140 in all chassis. It is noted that the interconnection modules in the supplementary chassis may be pre-programmed prior to their interconnection to the other chassis, or they may be programmed once the connections have been established. Also of note is the fact that the hardware connections within each chassis and between the chassis remain fixed, and are merely appended to as the router is scaled; rather, it is the software that adapts to the growing size of the router. Hence, the router can be scaled without ever having to replace any hardware (thus minimizing the cost) and without having to disconnect any physical connections between chassis or within any of the chassis (thus minimizing the down time). Thus, the use of a programmable interconnect module 140 within each chassis greatly simplifies scaling.

Figure 3A:
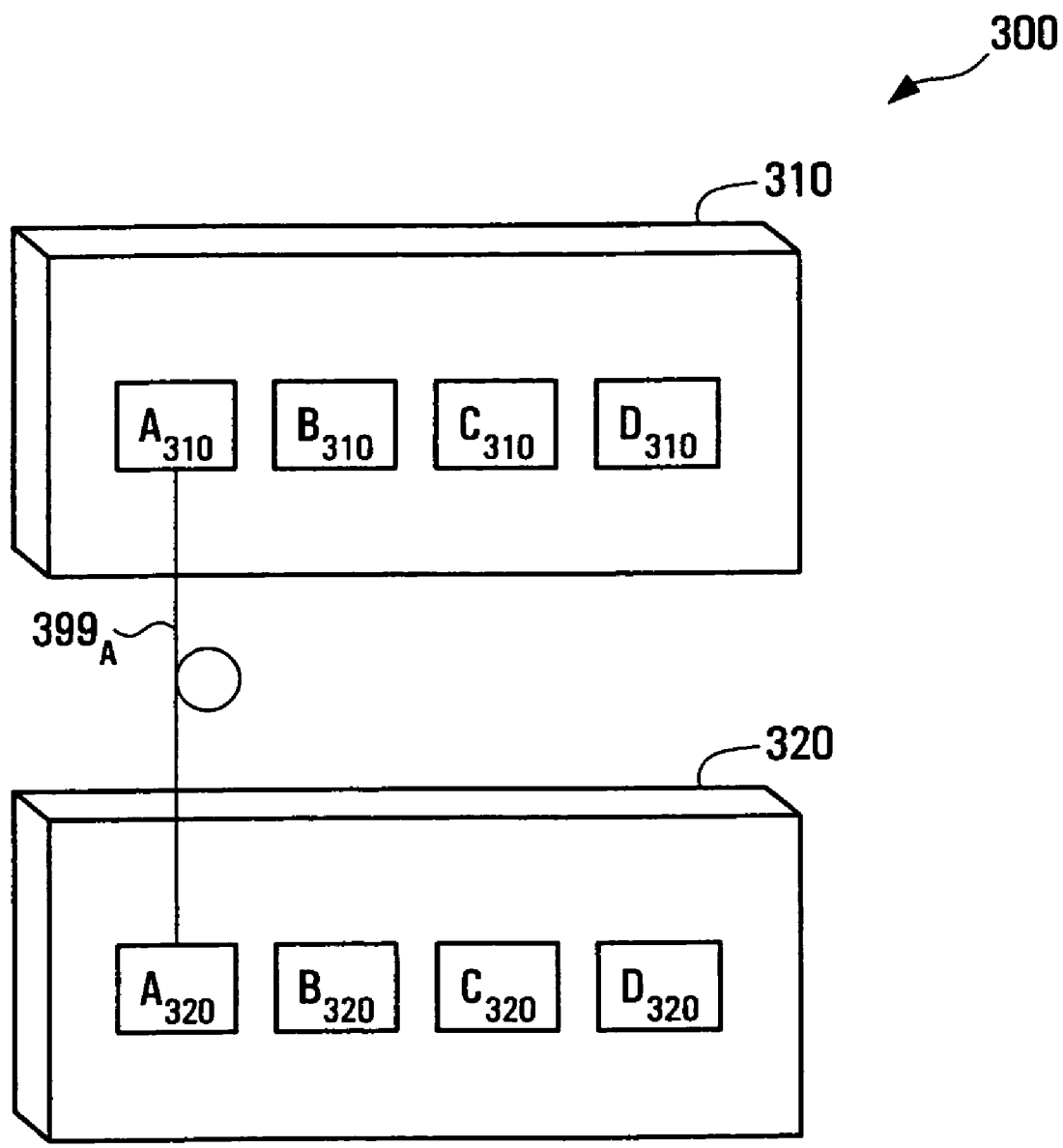
FIG. 3A shows a possible inter-chassis topology for building a router from two chassis.
Figure 4A:
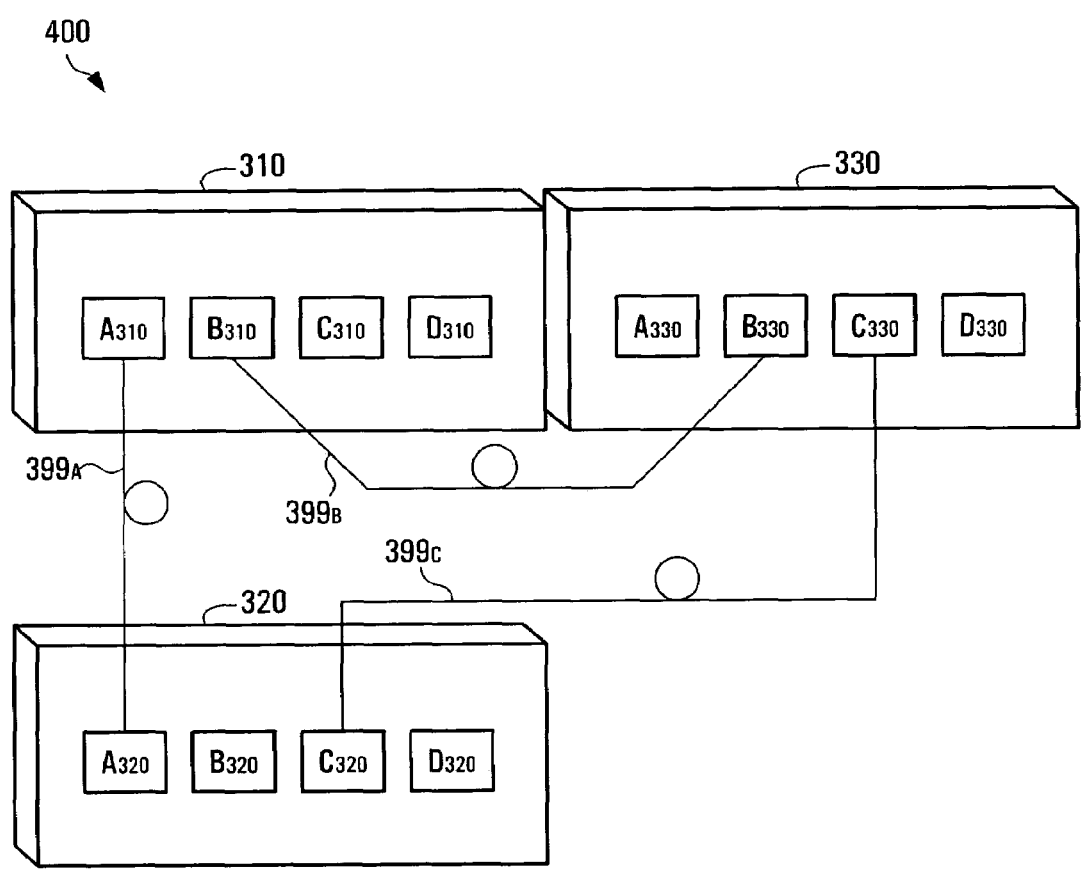
FIG. 4A shows a possible inter-chassis topology for building a router from three chassis.
Figure 4B:
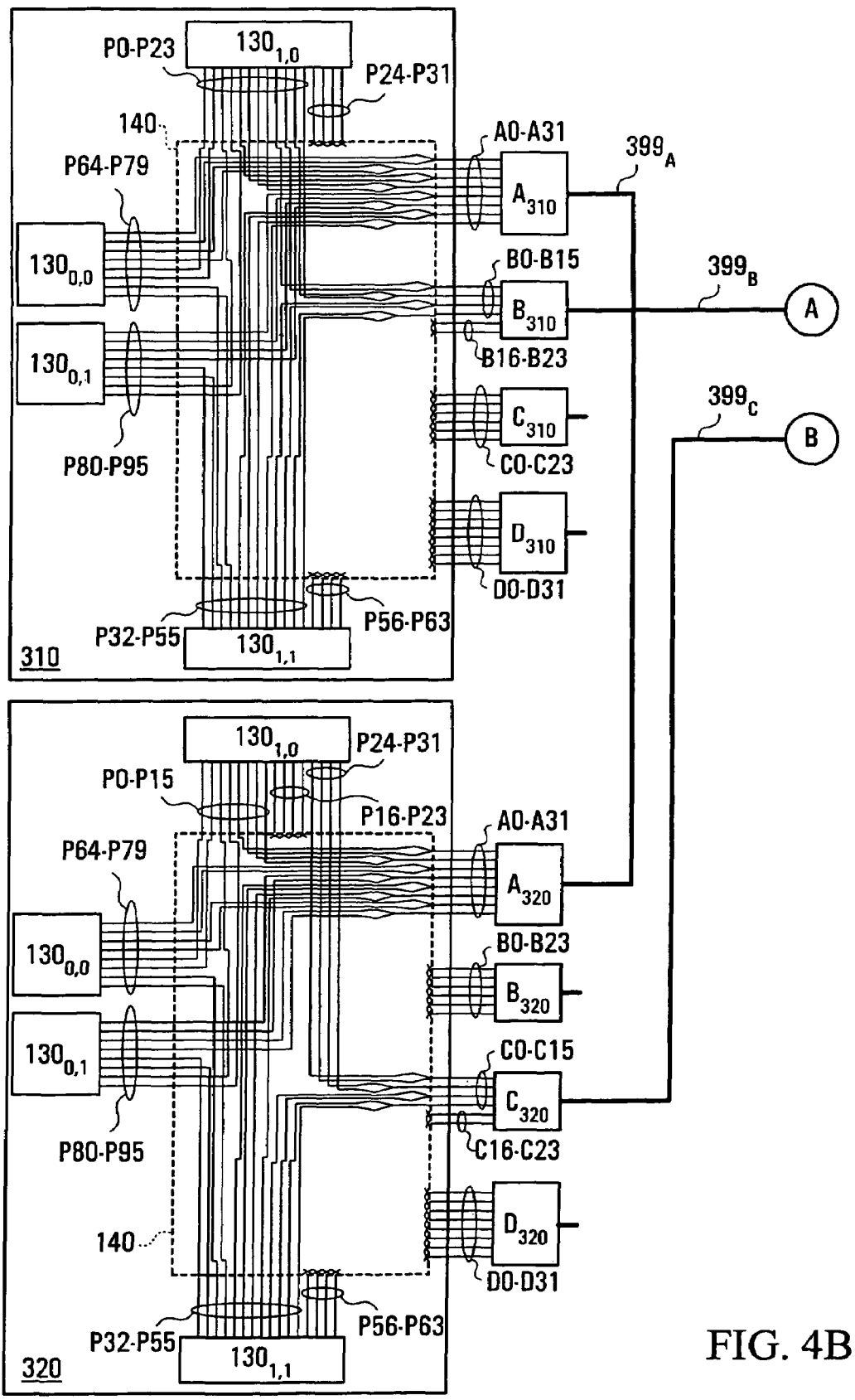
FIG. 4B shows a possible intra-chassis interconnection pattern for each of the chassis of FIG. 4A.
Figure 4B:
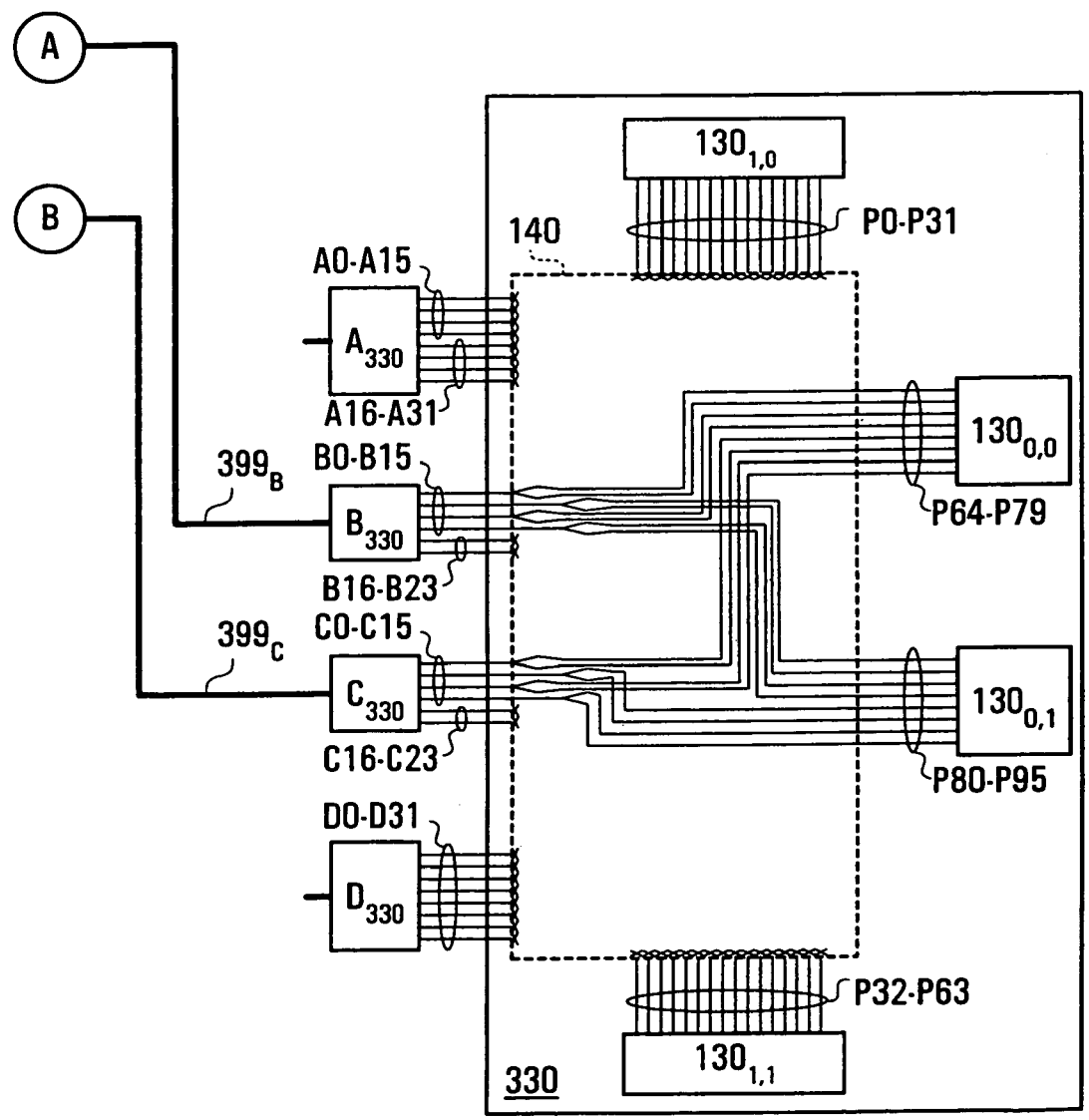
Figure 5A:
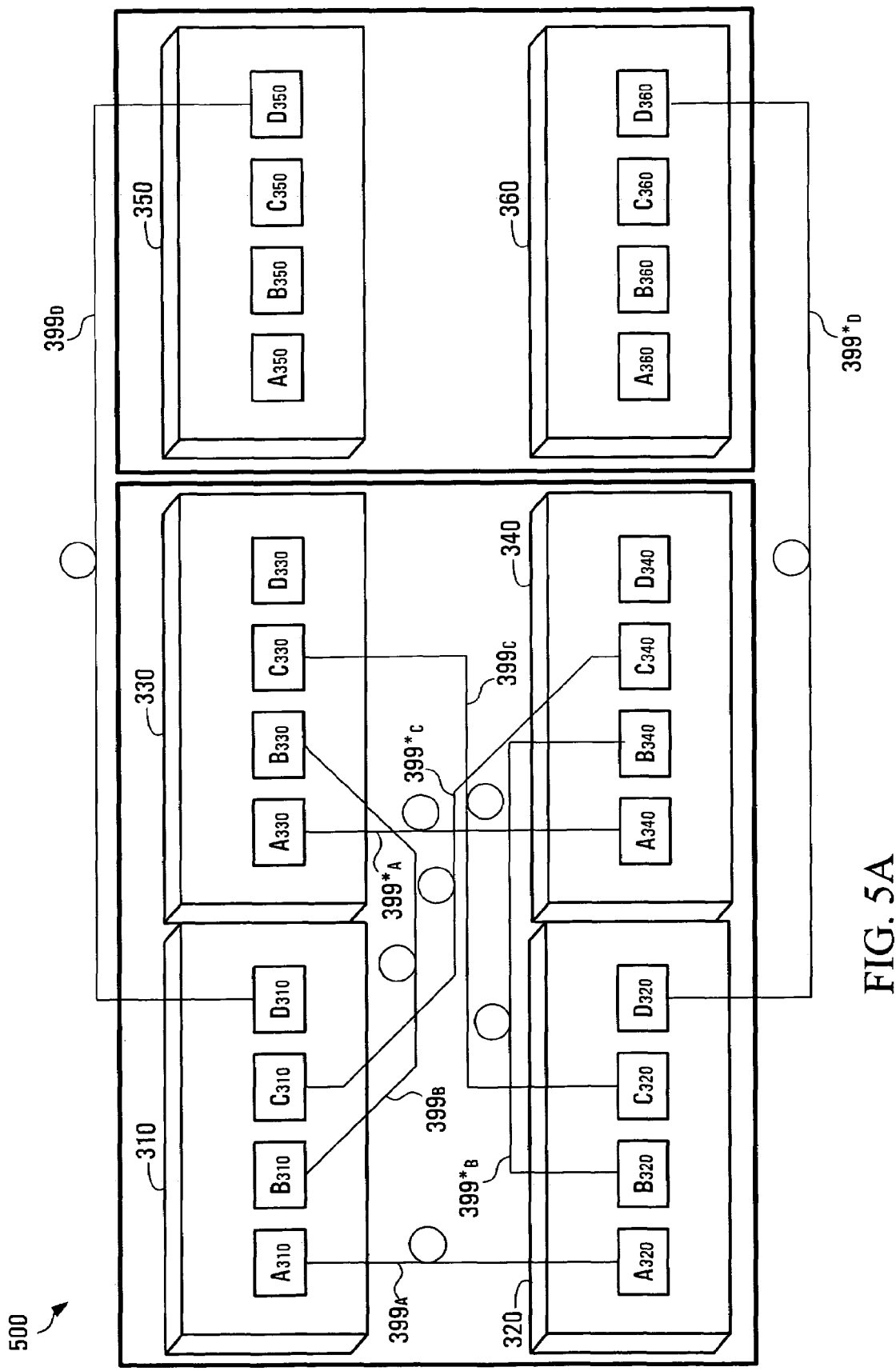
FIG. 5A shows a possible inter-chassis topology for building a router from six chassis.
Figure 5B:
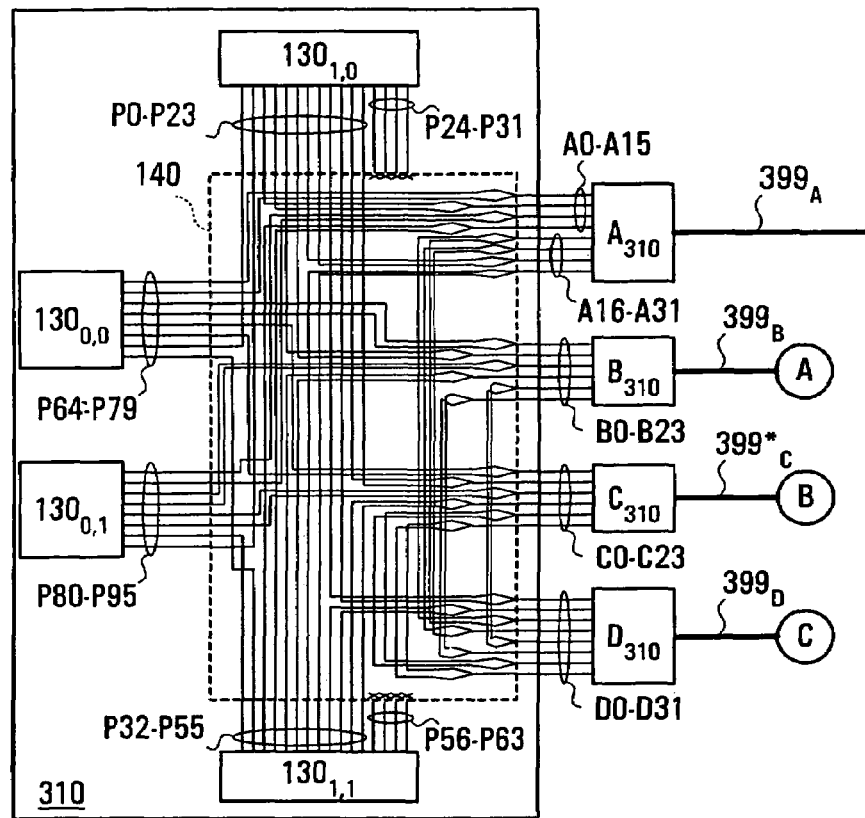
FIG. 5B shows a possible intra-chassis interconnection pattern for each of the chassis of FIG. 5A.
Figure 5B:
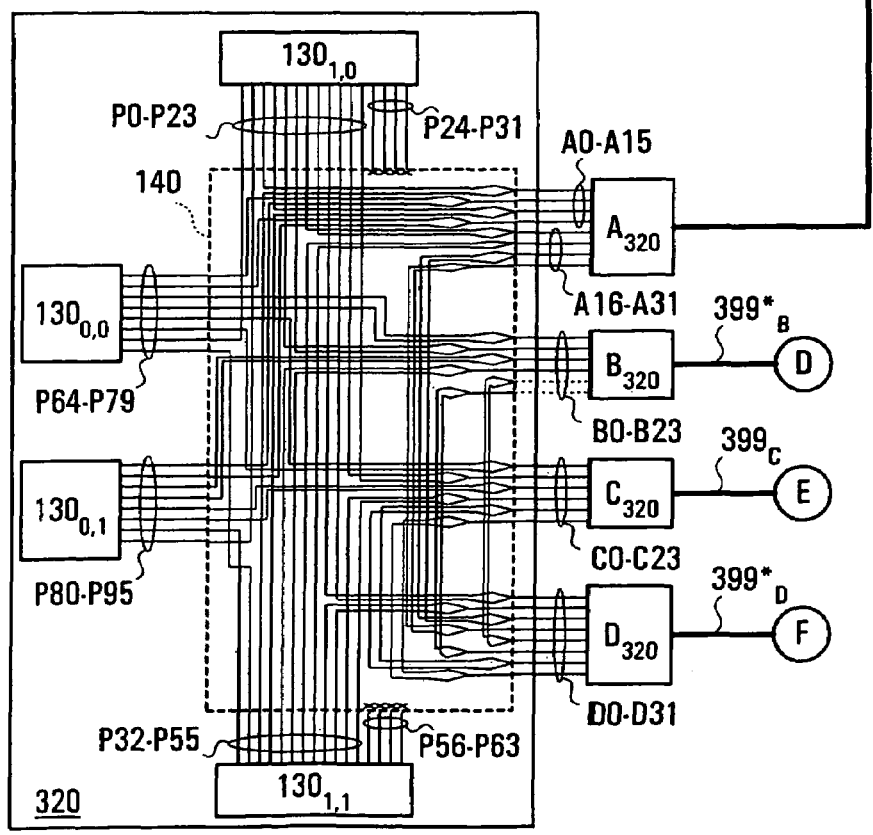
Figure 5B:
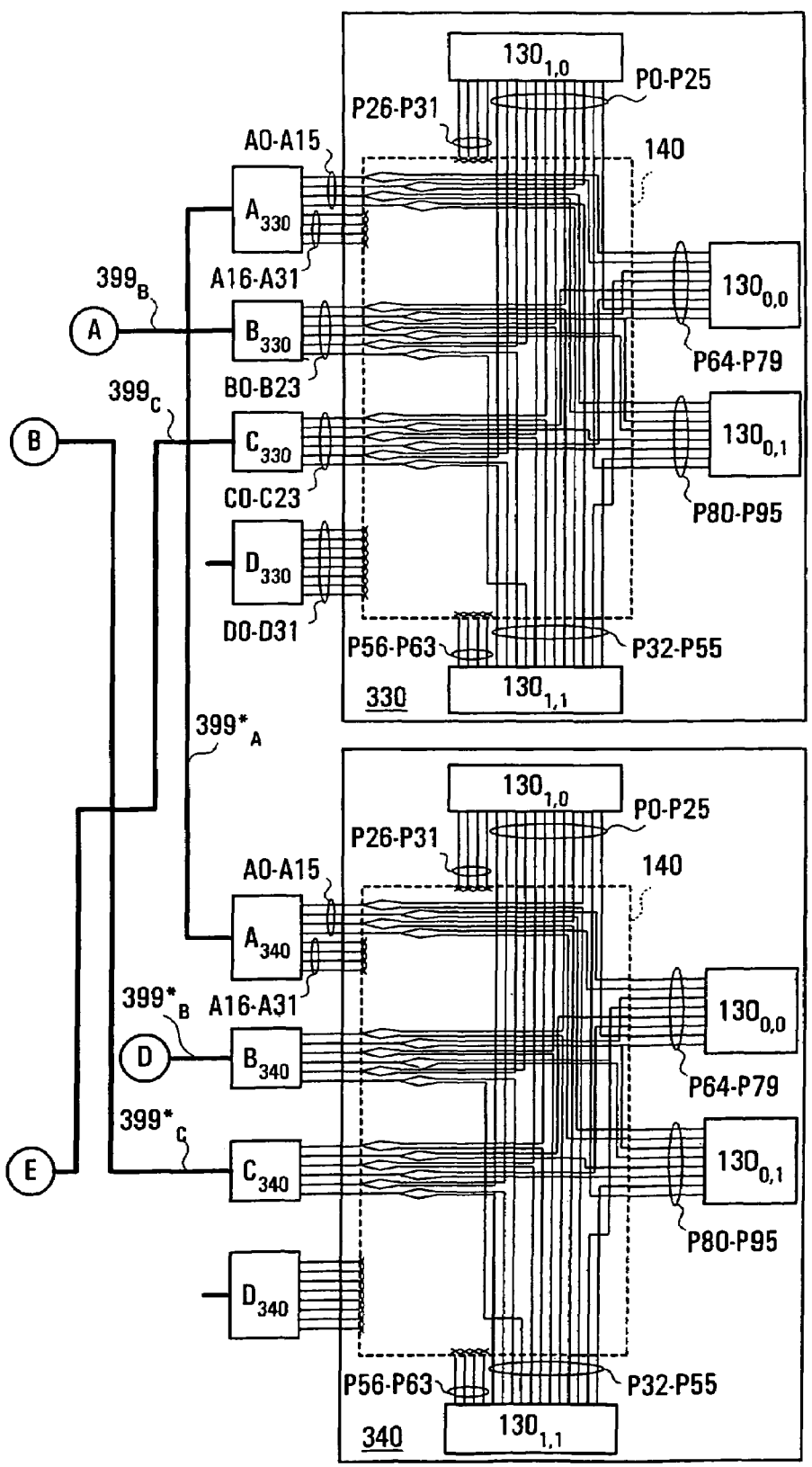
Figure 5B:
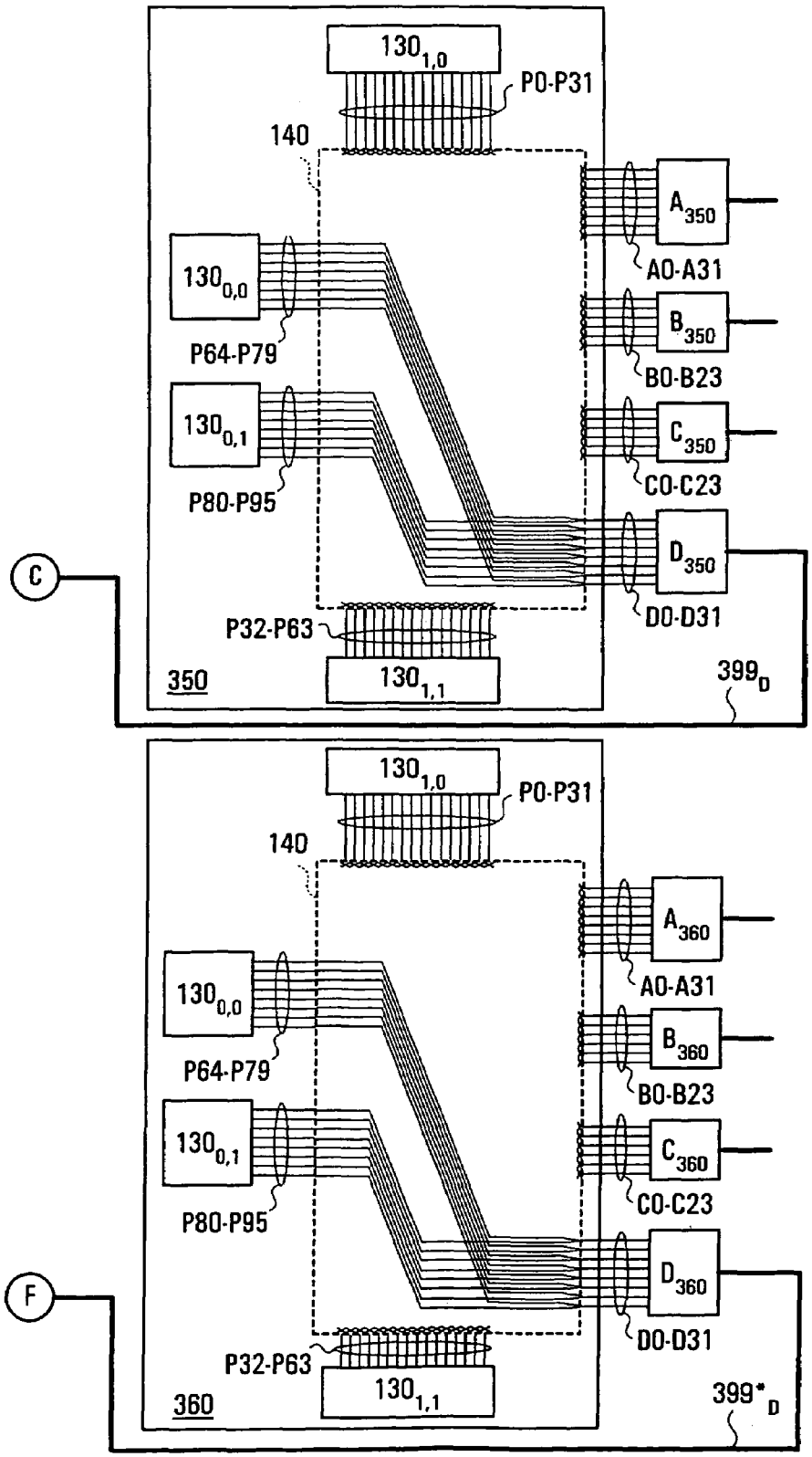

The connection map that is provided to the switch fabric 200 of an interconnection module 140 of a given chassis in the router will be a function of the chosen inter-chassis topology and the position of the given chassis within that topology. Care must therefore be taken to properly program each switch fabric 200 so as to allow the desired connectivity to take place. FIGS. 3A, 4A and 5A provide examples of an inter-chassis topology, for a router offering a progressively larger capacity. The accompanying FIGS. 3B, 4B and 5B provide examples of suitable intra-chassis interconnection possibilities that enable the router to achieve the requisite functionality at the corresponding stage of growth.

Accordingly, FIG. 3A shows a router 300 comprising only two interconnected chassis 310, 320. For ease of reference, each of the chassis 310, 320 is identical to the chassis described previously with reference to FIGS. 1 and 2. Therefore, each of the chassis 310, 320 includes four optical ports; specifically, chassis 310 includes optical ports $A_{310}$, $B_{310}$, $C_{310}$, $D_{310}$ and chassis 320 includes optical ports $A_{320}$, $B_{320}$, $C_{320}$, $D_{320}$. The inter-chassis topology is defined by optical port $A_{310}$ of chassis 310 being connected to optical port $A_{320}$ of chassis 320 by an optical fiber bundle $399_A$. In this case, optical fiber bundle $399_A$ establishes 32 full-duplex optical paths between optical ports $A_{310}$ and $A_{320}$, which can be carried as 64 unidirectional paths on 64 optical fibers or multiplexed in any suitable way.

Figure 3B:
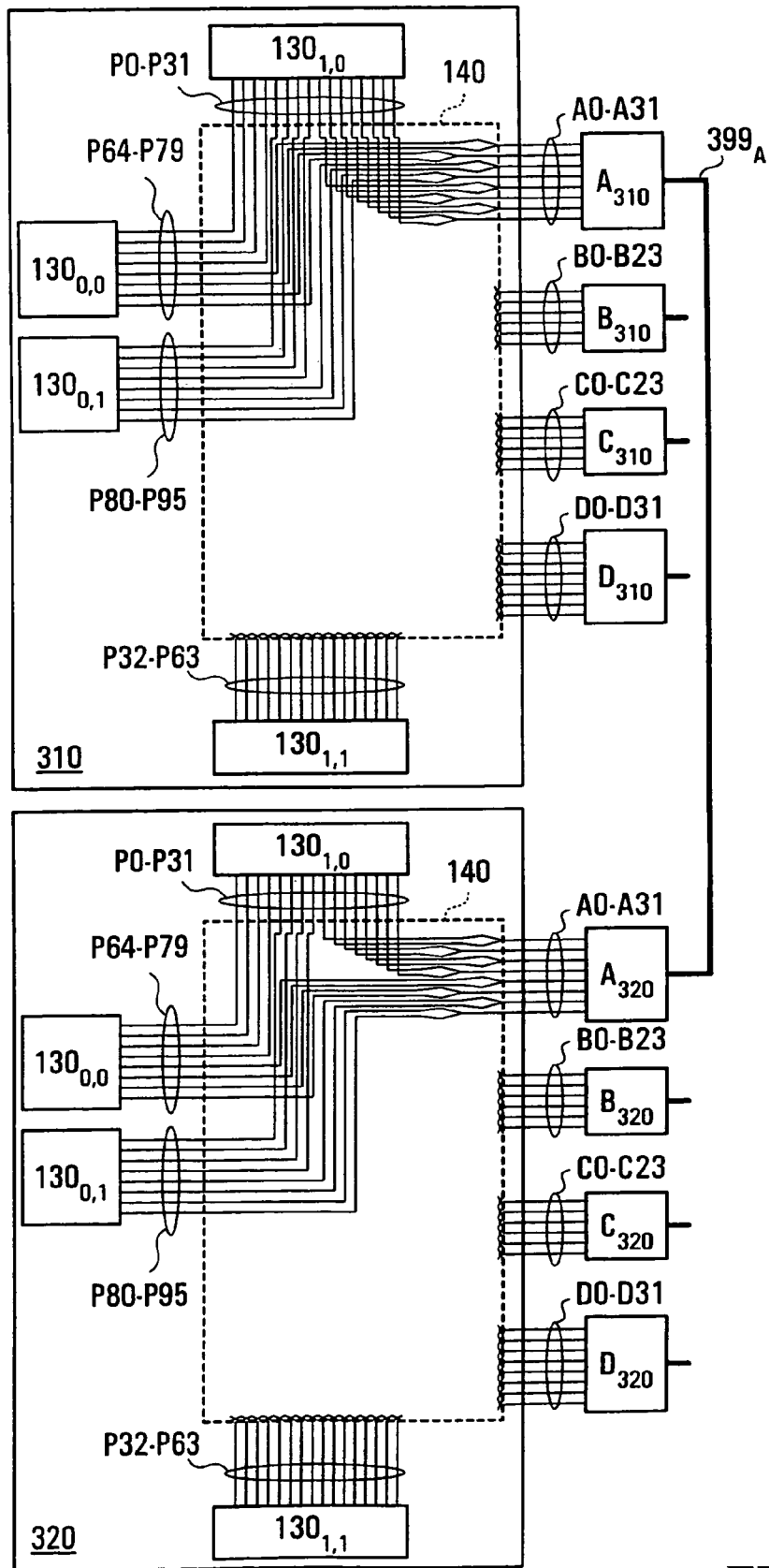
FIG. 3B shows a possible intra-chassis interconnection pattern for each of the chassis of FIG. 3A.

FIG. 3B provides a detailed view of the interconnection pattern established within each of the chassis 310, 320. It has been assumed that all paths are full-duplex paths, although each such full-duplex path may be implemented by a multiplicity of physical links. For ease of illustration, the line cards have been omitted. Also for ease of illustration, the input and output interfaces IN, OUT of the switch fabric in the interconnection module 140 are not specifically shown but they can be unambiguously determined from the correspondence established above with electrical paths $P_0$-$P_{95}$ (in the case of $IN_0$-$IN_{95}$ and $OUT_0$-$OUT_{95}$), optical paths $A_0$-$A_{31}$ (in the case of $IN_{96}$-$IN_{127}$ and $OUT_{96}$-$OUT_{127}$), optical paths $B_0$-$B_{23}$ (in the case of $IN_{128}$-$IN_{151}$ and $OUT_{128}$-$OUT_{151}$), optical paths $C_0$-$C_{23}$ (in the case of $IN_{152}$-$IN_{175}$ and $OUT_{152}$-$OUT_{175}$) and optical paths $D_0$-$D_{31}$ (in the case of $IN_{176}$-$IN_{207}$ and $OUT_{176}$-$OUT_{207}$).

Turning first to chassis 310 in FIG. 3B, the interconnection module 140 is programmed to establish the following connection groups:

(i) paths $P_{64}$-$P_{71}$ to paths $P_0$-$P_7$ (loopback)
(ii) paths $P_{72}$-$P_{79}$ to optical paths $A_0$-$A_7$ of optical port $A_{310}$
(iii) paths $P_{80}$-$P_{87}$ to paths $P_8$-$P_{15}$ (loopback)
(iv) paths $P_{88}$-$P_{95}$ to optical paths $A_8$-$A_{15}$ of optical port $A_{310}$
(v) paths $P_{16}$-$P_{31}$ to optical paths $A_{16}$-$A_{31}$ of optical port $A_{310}$ With continued reference to FIG. 3B, the interconnection module 140 of chassis 320 is programmed to establish the following connection groups:

(vi) paths $P_{64}$-$P_{71}$ to paths $P_0$-$P_7$ (loopback)
(vii) paths $P_{72}$-$P_{79}$ to optical paths $A_{16}$-$A_{23}$ of optical port $A_{320}$
(viii) paths $P_{80}$-$P_{87}$ to paths $P_8$-$P_{15}$ (loopback)
(ix) paths $P_{88}$-$P_{95}$ to optical paths $A_{24}$-$A_{31}$ of optical port $A_{320}$
(x) paths $P_{16}$-$P_{31}$ to optical paths $A_0$-$A_{15}$ of optical port $A_{320}$ With additional reference to FIG. 4A, the capacity of the router 300 of FIG. 3A and 3B can be augmented by adding a third chassis 330 to the existing set of chassis 310, 320, resulting in the creation of a router 400. Chassis 330 has a plurality of optical ports denoted $A_{330}$, $B_{330}$, $C_{330}$, $D_{330}$. A fiber bundle $399_B$ is connected between optical ports $B_{310}$ and $B_{330}$ on chassis 310 and 330, respectively, while a fiber bundle $399_C$ is connected between optical ports $C_{320}$ and $C_{330}$ on chassis 320 and 330, respectively. It is noted that fiber bundle $399_A$, which joins optical ports $A_{310}$ and $A_{320}$ on chassis 310 and 320, respectively, remains intact and that none of the hardware within any chassis needs to be replaced, disconnected to re-connected.

FIG. 4B provides a more detailed view of one possible intra-chassis interconnection pattern which can be established by the interconnection module 140 of each chassis 310, 320, 330 and which allows the router 400 to function as a scaled version of the router 300. It is recalled that the actual connections (i.e., from electrical interface to electrical interface) of the switch fabric within each interconnection module 140 can be derived from the illustrated interconnection pattern and from the correspondence between the interfaces and the paths, which was described earlier with reference to FIGS. 2 and 3B. Specifically, the following connection groups have been established within chassis 310:

(i) paths $P_{64}$-$P_{71}$ to optical paths $A_0$-$A_7$ of optical port $A_{310}$
(ii) paths $P_{72}$-$P_{75}$ to paths $P_0$-$P_3$ (loopback)
(iii) paths $P_{76}$-$P_{79}$ to paths $P_{36}$-$P_{39}$ (loopback)
(iv) paths $P_{80}$-$P_{87}$ to optical paths $A_{16}$-$A_{23}$ of optical port $A_{310}$
(v) paths $P_{88}$-$P_{91}$ to paths $P_{32}$-$P_{35}$ (loopback)
(vi) paths $P_{92}$-$P_{95}$ to paths $P_4$-$P_7$ (loopback)
(vii) paths $P_8$-$P_{15}$ to optical paths $A_8$-$A_{15}$ of optical port $A_{310}$
(viii) paths $P_{16}$-$P_{23}$ to optical paths $B_0$-$B_7$ of optical port $B_{310}$
(ix) paths $P_{40}$-$P_{47}$ to optical paths $A_{24}$-$A_{31}$ of optical port $A_{310}$
(x) paths $P_{48}$-$P_{55}$ to optical paths $B_8$-$B_{15}$ of optical port $B_{310}$ With continued reference to FIG. 4B, the interconnection module 140 of chassis 320 is programmed to establish the following connection groups:

(xi) paths $P_{64}$-$P_{67}$ to optical paths $A_8$-$A_{11}$ of optical port $A_{320}$
(xii) paths $P_{68}$-$P_{71}$ to optical paths $A_{24}$-$A_{27}$ of optical port $A_{320}$
(xiii) paths $P_{72}$-$P_{75}$ to paths $P_0$-$P_3$ (loopback)
(xiv) paths $P_{76}$-$P_{79}$ to paths $P_{36}$-$P_{39}$ (loopback)
(xv) paths $P_{80}$-$P_{83}$ to optical paths $A_{12}$-$A_{15}$ of optical port $A_{320}$
(xvi) paths $P_{84}$-$P_{87}$ to optical paths $A_{28}$-$A_{31}$ of optical port $A_{320}$
(xvii) paths $P_{88}$-$P_{91}$ to paths $P_{32}$-$P_{35}$ (loopback)
(xviii) paths $P_{92}$-$P_{95}$ to paths $P_4$-$P_7$ (loopback)
(xix) paths $P_8$-$P_{15}$ to optical paths $A_0$-$A_7$ of optical port $A_{320}$
(xx) paths $P_{24}$-$P_{31}$ to optical paths $C_0$-$C_7$ of optical port $C_{320}$
(xxi) paths $P_{40}$-$P_{47}$ to optical paths $A_{16}$-$A_{23}$ of optical port $A_{320}$
(xxii) paths $P_{48}$-$P_{55}$ to optical paths $C_8$-$C_{15}$ of optical port $C_{320}$ With continued reference to FIG. 4B, the interconnection module 140 of chassis 330 is programmed to establish the following connection groups:

(xxiii) paths $P_{64}$-$P_{67}$ to optical paths $B_0$-$B_3$ of optical port $B_{330}$
(xxiv) paths $P_{68}$-$P_{71}$ to optical paths $B_8$-$B_{11}$ of optical port $B_{330}$
(xxv) paths $P_{72}$-$P_{75}$ to optical paths $C_0$-$C_3$ of optical port $C_{330}$
(xxvi) paths $P_{76}$-$P_{79}$ to optical paths $C_8$-$C_{11}$ of optical port $C_{330}$
(xxvii) paths $P_{80}$-$P_{83}$ to optical paths $B_4$-$B_7$ of optical port $B_{330}$
(xxviii) paths $P_{84}$-$P_{87}$ to optical paths $B_{12}$-$B_{15}$ of optical port $B_{330}$
(xxix) paths $P_{88}$-$P_{91}$ to optical paths $C_4$-$C_7$ of optical port $C_{330}$
(xxx) paths $P_{92}$-$P_{95}$ to optical paths $C_{12}$-$C_{15}$ of optical port $C_{330}$ Thus, it has been shown that the capacity of a router designed according to an embodiment of the present invention can be increased by (1) adding a new chassis; (2) connecting one or more additional fiber bundles between the optical ports of the chassis; and (3) re-programming the interconnection module 140 in each chassis via the controller 250. No existing connection within any chassis or between any pair of chassis needs to be physically dismantled or re-established, resulting in a truly scalable solution to the problem of increasing router capacity. It is also noted that the interconnection module in new chassis may be pre-programmed prior to its interconnection to the existing chassis, or it may be programmed once the connections to the existing chassis have been established.

With additional reference now to FIG. 5A, it is shown how the capacity of the router 400 of FIGS. 4A and 4B can be further augmented without requiring the disconnection or re-connection of equipment, and without requiring existing equipment to be replaced. Specifically, the addition of three more chassis 340, 350, 360 results in the creation of a router 500. Chassis 340 has a plurality of ports denoted $A_{340}$, $B_{340}$, $C_{340}$, $D_{340}$, chassis 350 has a plurality of ports denoted $A_{350}$, $B_{350}$, $C_{350}$, $D_{350}$ and chassis 360 has a plurality of ports denoted $A_{360}$, $B_{360}$, $C_{360}$, $D_{360}$.

A fiber bundle $399*_A$ is connected between optical ports $A_{330}$ and $A_{340}$ on chassis 330 and 340, respectively. A fiber bundle $399*_B$ is connected between optical ports $B_{320}$ and $B_{340}$ on chassis 320 and 340, respectively. A fiber bundle $399*_C$ is connected between optical ports $C_{310}$ and $C_{340}$ on chassis 310 and 340, respectively. A fiber bundle $399_D$ is connected between optical ports $D_{310}$ and $D_{350}$ on chassis 310 and 350, respectively. Finally, a fiber bundle $399*_D$ is connected between optical ports $D_{320}$ and $D_{360}$ on chassis 320 and 360, respectively. It is noted that fiber bundles $399_A$, $399_B$ and $399_C$ remain intact and that none of the hardware within any given chassis needs to be replaced, disconnected to re-connected.

FIG. 5B provides a more detailed view of suitable connections that can be established by the interconnection module within each of the chassis 310, 320, 330, 340, 350 and 360, thus demonstrating scalability of the three-chassis router 400 of FIG. 4A to the six-chassis router 500 of FIG. 5A. Specifically, the following connection groups are established for chassis 310:

(i) paths $P_{64}$-$P_{67}$ to optical paths $A_0$-$A_3$ of optical port $A_{310}$
(ii) paths $P_{68}$-$P_{71}$ to optical paths $B_0$-$B_3$ of optical port $B_{310}$
(iii) paths $P_{72}$-$P_{75}$ to optical paths $C_0$-$C_3$ of optical port $C_{310}$
(iv) paths $P_{76}$-$P_{77}$ to paths $P_0$-$P_1$ (loopback)
(v) paths $P_{78}$-$P_{79}$ to paths $P_{34}$-$P_{35}$ (loopback)
(vi) paths $P_{80}$-$P_{83}$ to optical paths $A_8$-$A_{11}$ of optical port $A_{310}$
(vii) paths $P_{84}$-$P_{87}$ to optical paths $B_8$-$B_{11}$ of optical port $B_{310}$
(viii) paths $P_{88}$-$P_{91}$ to optical paths $C_8$-$C_{11}$ of optical port $C_{310}$
(ix) paths $P_{92}$-$P_{93}$ to paths $P_{32}$-$P_{33}$ (loopback)
(x) paths $P_{94}$-$P_{95}$ to paths $P_2$-$P_3$ (loopback)
(xi) paths $P_4$-$P_7$ to optical paths $A_4$-$A_7$ of optical port $A_{310}$
(xii) paths $P_8$-$P_{11}$ to optical paths $B_4$-$B_7$ of optical port $B_{310}$
(xiii) paths $P_{12}$-$P_{15}$ to optical paths $A_{12}$-$A_{15}$ of optical port $A_{310}$
(xiv) paths $P_{16}$-$P_{19}$ to optical paths $D_0$-$D_4$ of optical port $D_{310}$
(xv) paths $P_{20}$-$P_{23}$ to optical paths $C_4$-$C_7$ of optical port $C_{310}$
(xvi) paths $P_{36}$-$P_{39}$ to optical paths $A_{12}$-$A_{15}$ of optical port $A_{310}$
(xvii) paths $P_{40}$-$P_{43}$ to optical paths $B_{12}$-$B_{15}$ of optical port $B_{310}$
(xviii) paths $P_{44}$-$P_{47}$ to optical paths $A_{28}$-$A_{31}$ of optical port $A_{310}$
(xix) paths $P_{48}$-$P_{51}$ to optical paths $D_4$-$D_7$ of optical port $D_{310}$
(xx) paths $P_{52}$-$P_{55}$ to optical paths $C_{12}$-$C_{15}$ of optical port $C_{310}$
(xxi) optical paths $A_{16}$-$A_{23}$ to optical paths $D_8$-$D_{15}$ (loopback)
(xxii) optical paths $B_{16}$-$B_{23}$ to optical paths $D_{16}$-$D_{23}$ (loopback)
(xxiii) optical paths $C_{16}$-$C_{23}$ to optical paths $D_{24}$-$D_{31}$ (loopback)

With continued reference to FIG. 5B, the interconnection module 140 of chassis 320 is programmed to establish the following connection groups:

(xxiv) paths $P_{64}$-$P_{65}$ to optical paths $A_4$-$A_5$ of optical port $A_{320}$
(xxv) paths $P_{66}$-$P_{67}$ to optical paths $A_{12}$-$A_{13}$ of optical port $A_{320}$
(xxvi) paths $P_{68}$-$P_{71}$ to optical paths $B_0$-$B_3$ of optical port $B_{320}$
(xxvii) paths $P_{72}$-$P_{75}$ to optical paths $C_0$-$C_3$ of optical port $C_{320}$
(xxviii) paths $P_{76}$-$P_{77}$ to paths $P_0$-$P_1$ (loopback)
(xxix) paths $P_{78}$-$P_{79}$ to paths $P_{34}$-$P_{35}$ (loopback)
(xxx) paths $P_{80}$-$P_{81}$ to optical paths $A_6$-$A_7$ of optical port $A_{320}$
(xxxi) paths $P_{82}$-$P_{83}$ to optical paths $A_{14}$-$A_{15}$ of optical port $A_{320}$
(xxxii) paths $P_{84}$-$P_{87}$ to optical paths $B_8$-$B_{11}$ of optical port $B_{320}$
(xxxiii) paths $P_{88}$-$P_{91}$ to optical paths $C_8$-$C_{11}$ of optical port $C_{320}$
(xxxiv) paths $P_{92}$-$P_{93}$ to paths $P_{32}$-$P_{33}$ (loopback)
(xxxv) paths $P_{94}$-$P_{95}$ to paths $P_2$-$P_3$ (loopback)
(xxxvi) paths $P_4$-$P_5$ to optical paths $A_0$-$A_1$ of optical port $A_{320}$
(xxxvii) paths $P_6$-$P_7$ to optical paths $A_8$-$A_9$ of optical port $A_{320}$
(xxxviii) paths $P_8$-$P_{11}$ to optical paths $B_4$-$B_7$ of optical port $B_{320}$
(xxxix) paths $P_{12}$-$P_{15}$ to optical paths $A_{16}$-$A_{19}$ of optical port $A_{320}$
(xl) paths $P_{16}$-$P_{19}$ to optical paths $D_0$-$D_3$ of optical port $D_{320}$
(xli) paths $P_{20}$-$P_{23}$ to optical paths $C_4$-$C_7$ of optical port $C_{320}$
(xlii) paths $P_{36}$-$P_{37}$ to optical paths $A_2$-$A_3$ of optical port $A_{320}$
(xliii) paths $P_{38}$-$P_{39}$ to optical paths $A_{10}$-$A_{11}$ of optical port $A_{320}$
(xliv) paths $P_{40}$-$P_{43}$ to optical paths $B_{12}$-$B_{15}$ of optical port $B_{320}$
(xlv) paths $P_{44}$-$P_{47}$ to optical paths $A_{20}$-$A_{23}$ of optical port $A_{320}$
(xlvi) paths $P_{48}$-$P_{51}$ to optical paths $D_4$-$D_7$ of optical port $D_{320}$
(xlvii) paths $P_{52}$-$P_{55}$ to optical paths $C_{12}$-$C_{15}$ of optical port $C_{320}$
(xlviii) optical paths $A_{24}$-$A_{31}$ to optical paths $D_8$-$D_{15}$ (loopback)
(xlix) optical paths $B_{16}$-$B_{23}$ to optical paths $D_{16}$-$D_{23}$ (loopback)
(l) optical paths $C_{16}$-$C_{23}$ to optical paths $D_{24}$-$D_{31}$ (loopback)

The connections for the other chassis (namely, chassis 330, 340, 350 and 360) can similarly be obtained from inspection of FIG. 5B by a person of ordinary skill in the art.

From the above, it is again seen how the capacity of a router designed according to an embodiment of the present invention can be increased by simply (1) adding a set of additional chassis; (2) connecting additional fiber bundles between the optical ports of the existing and additional chassis; and (3) re-programming the interconnection module 140 in each chassis via the controller 250. No existing connection within any chassis or between any pair of chassis needs to be physically dismantled or re-established, resulting in a truly scalable solution to the problem of increasing router capacity.

It also should be noted that for the router 500 of FIGS. 5A and 5B, there are six chassis but only four optical ports per chassis and hence there are more chassis in the router 500 than there are optical ports per chassis. When this occurs, it may be useful to divide the router into "clusters" of chassis where, in this case, there are up to four chassis per cluster. For each chassis, three optical ports per chassis are reserved for connections with other chassis within the same cluster, while the remaining (fourth) optical port is used to connect to a chassis in another cluster. In general, for an N-port chassis, where M−1 of N ports are reserved for intra-cluster connections, the total number of M-chassis clusters that can be accommodated is (N−(M−1))+1=N−M+2. In the case where N=M (as in FIG. 5A), the maximum number of clusters is two, with M (or N, since N is equal to M) chassis in each cluster.

It should be appreciated that the number of chassis required to achieve a certain switching capacity may exceed the maximum number of chassis that can be accommodated by clustering. Nonetheless, it is still possible to build a scalable router in accordance with an embodiment of the present invention. In such a case, an additional component needs to be introduced, namely a "chassis interconnection module" (CIM).

Figure 6:
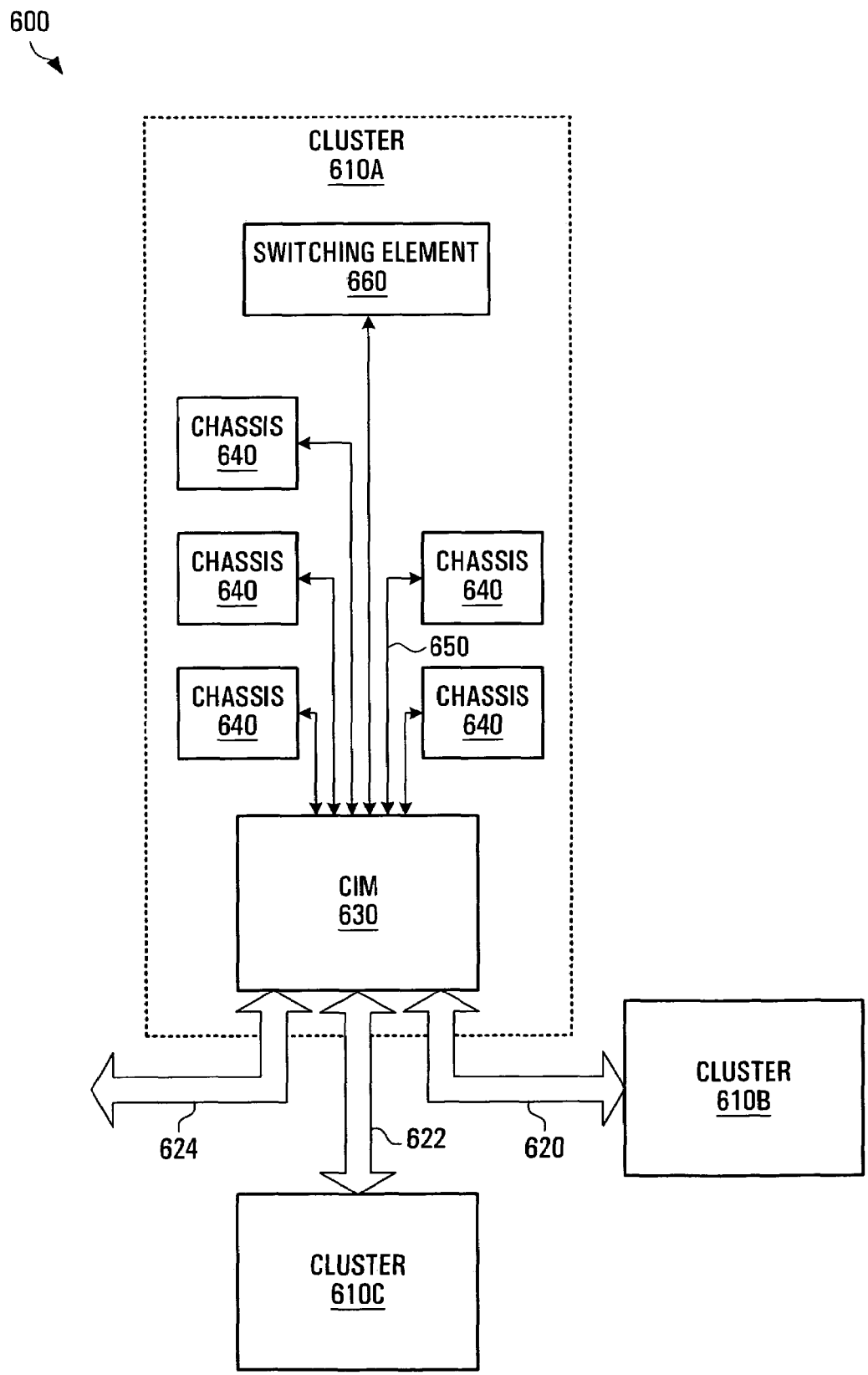
FIG. 6 illustrates, in schematic form, a router made up of a set of "clusters" of chassis.

By way of example, FIG. 6 shows a router 600 composed of three clusters 610A, 610B and 610C. Within cluster 610A are contained five chassis 640 and an optional switching element 660, all of which connected to a common CIM 630 via fiber optic bundles (or DWDM fibers) 650. The CIM 630 for a given cluster may have a larger number of ports than any one chassis and provides programmable optical interconnections (e.g., using MEMS devices). The illustrated embodiment shows that none of the chassis within a given cluster is connected directly to another chassis within that cluster Such chassis-to-chassis connections are provided by "loopback" functionality of the CIM 630, which allows connecting two chassis together within the same cluster and connecting two other CIMs via the CIM 630. Nevertheless, it is within the scope of the present invention to provide chassis-to-chassis connections within the same cluster, which may be advantageous when implementing a hypercube-based topology.

The clusters themselves are interconnected via the CIM in each cluster. An ultra-dense optical link may interconnect the CIMs in the various clusters. For instance, in the illustrated embodiment, link 620 connects the CIMs in clusters 610A and 610B, while link 622 connects the CIMs in clusters 610A and 610C. A link 624 emanates from CIM 630 and is unused for the time being but is available for future use, in case another cluster is added to the router 600. The ultra-dense links 620, 622, 624 may be DWDM optical fibers or they may comprise bundles of single-carrier or coarsely multiplexed optical fibers.

In this way, different numbers of clusters can be interconnected to form a router. Scalability of the router is achieved by adding one or more clusters (with respective CIMS), adding selected connections between CIMs and re-programming the CIMs. No intra-cluster connections need to be disabled or re-connected. Careful observation of this architecture reveals similarity with the architecture of FIG. 1, where the CIM of FIG. 6 plays the role of the interconnection module 140 of FIG. 1. Thus, one skilled in the art who has understood how the interconnection module can be reprogrammed to provide the required connectivity will also understand how the same can be achieved by re-programming the CIM 630.

It should be understood, of course, that the above described functionality of the chassis and routers can apply to multiple individual streams of data flow, sometimes referred to as "data planes". Thus, although the above description has been formulated in terms of a single data plane, it should be understood that the present invention is equally applicable to the transmission of information across multiple independent planes which draw upon the resources of a common set of chassis. The line cards and processing cards in each chassis may either be dedicated to a particular data plane or may be shared amongst two or more date planes.

Also, the term "card" is meant to be interpreted broadly so as to cover not only a printed circuit board that has connectors disposed primarily along an edge thereof, but also other modules that contain circuitry, software and/or control logic capable of providing the requisite functionality. A large-area wafer comprising all the requisite internal circuitry of one or more "cards" is also envisaged.

While specific embodiments of the invention have been described and illustrated, those skilled in the art will appreciate that further modifications and variations may be made without departing from the scope of the invention as defined in the claims appended hereto.

We claim:
1. A router, comprising:
a plurality of chassis, each chassis comprising a plurality of processing modules and a programmable interconnection module;
a data connection between each processing module on each chassis and the interconnection module on the same chassis; and
a data connection between the interconnection module on each chassis and at least one interconnection module on respective other chassis;
at least one programmable interconnection module being operative for:
1) establishing switchable connections between individual processing modules on its chassis and between at least one processing module on its chassis and at least one interconnection module on another chassis;
2) upon addition of an additional chassis to said router, changing said switchable connections such that at least one of said processing modules on its chassis is connected to an interconnection module on said additional chassis.

2. A router as defined in claim 1, wherein the data connections between the processing modules on each chassis and the interconnection module on the same chassis are electrical and wherein the data connections between the interconnection modules on different chassis are optical.

3. A router as defined in claim 1,
wherein the interconnection module on each chassis includes a plurality of electrical input ports, a plurality of electrical output ports and a programmable switch fabric disposed therebetween, the switch fabric being capable of selectively establishing connections between individual ones of the electrical input ports and corresponding ones of the electrical output ports in accordance with a connection map respectively associated with said chassis.

4. A router as defined in claim 3, wherein the interconnection module on each chassis includes a signal conditioning module connected to the switch fabric in said interconnection module.

5. A router as defined in claim 3, wherein the switch fabric in the interconnection module on each chassis is adapted to provide signal conditioning functionality.

6. A router as defined in claim 3,
wherein each processing module on each chassis includes a plurality of electrical input ports, a plurality of electrical output ports and a processing fabric disposed therebetween.

7. A router as defined in claim 6,
wherein a subset of the plurality of electrical input ports of each processing module on each chassis is connected to a respective subset of the electrical output ports of the interconnection module on that chassis.

8. A router as defined in claim 7,
wherein a subset of the plurality of electrical output ports of each processing module on each chassis is connected to a respective subset of the electrical input ports of the interconnection module on that chassis.

9. A router as claimed in claim 3, each chassis further including:
a plurality of optical input ports;
a plurality of optical output ports;
a plurality of optical-to-electrical conversion units, each optical-to-electrical conversion unit being connected between a respective one of the optical input ports and a respective subset of the electrical input ports of the interconnection module on said chassis; and a plurality of electrical-to-optical conversion units, each electrical-to-optical conversion unit being connected between a respective subset of the electrical output ports of the interconnection module on said chassis and a respective one of the optical output ports.

10. A router as defined in claim 6, each chassis further including:

a plurality of network interface modules for interfacing with an external network, each network interface module being connected to one or more respective electrical input ports and one or more respective output ports of one or more of the processing modules on said chassis.

11. A router as defined in claim 10, wherein the network interface modules are line cards.

12. A router as defined in claim 1, wherein the data connections between the processing modules on each chassis and the interconnection module on the same chassis are low-bandwidth connections and wherein the data connections between the interconnection modules on different chassis are high-bandwidth connections.

13. A router as defined in claim 6, wherein the processing fabric on at least one of the processing modules on at least one of the chassis is adapted to perform packet switching between the electrical input ports and the electrical output ports of said at least one of the processing modules.

14. A router as defined in claim 3, wherein the programmable switch fabric in the interconnection module on at least one of the chassis implements a fully non-blocking switch.

15. A router as defined in claim 3, wherein the programmable switch fabric in the interconnection module on at least one of the chassis provides loopback functionality.

16. A router as defined in claim 3, wherein at least one of the chassis further comprises a controller connected to the interconnection module on that chassis, for providing the respective connection map to the switch fabric.

17. A router as defined in claim 16, wherein the controller on at least one of the chassis is adapted to be controllable from a location remote to the router.

18. A router as defined in claim 1,
wherein the chassis are arranged in two or more clusters;
wherein each chassis in each cluster includes at least one port reserved for intra-cluster connections with chassis in said cluster and at least one port reserved for inter-cluster connections with chassis in other clusters.

19. A router as defined in claim 1,
wherein the chassis are arranged in two or more clusters, each cluster including a chassis interconnection module connected to all the chassis in said cluster;
wherein connections between chassis of a particular one of the clusters are established through the chassis interconnection module of the particular cluster; and
wherein connections between each pair of clusters are established through the chassis interconnection modules of the clusters of said pair.

20. A router as defined in claim 19,
wherein the chassis interconnection module of each cluster is adapted to provide programmable connections between different chassis in said cluster and between the chassis in said cluster and the chassis interconnection modules of other clusters.

21. A chassis for use in building a scalable router, comprising:

a plurality of processing modules, each processing module including a plurality of electrical input ports, a plurality of electrical output ports and a processing fabric disposed therebetween;

a programmable interconnection module, including a plurality of electrical input ports, a plurality of electrical output ports and a programmable switch fabric disposed therebetween, for creating selectively established switchable connections between individual ones of the electrical input ports and corresponding ones of the electrical output ports in accordance with a connection map, said interconnection module being operative for changing said selectively established switchable connections upon addition of an additional chassis to the scalable router;

a data connection between each processing module and the interconnection module, whereby a subset of the plurality of electrical input ports of each processing module on each chassis is connected to a respective subset of the electrical output ports of the interconnection module on that chassis and whereby a subset of the plurality of electrical output ports of each processing module on each chassis is connected to a respective subset of the electrical input ports of the interconnection module on that chassis a plurality of optical input ports and a plurality of optical output ports, for external connection to one or more other chassis of the router;

a plurality of optical-to-electrical conversion units, each optical-to-electrical conversion unit being connected between a respective one of the optical input ports and a respective subset of the electrical input ports of the interconnection module; and a plurality of electrical-to-optical conversion units, each electrical-to-optical conversion unit being connected between a respective subset of the electrical output ports of the interconnection module and a respective one of the optical output ports.

22. A chassis as defined in claim 21, further comprising:

a plurality of network interface modules for interfacing with an external network, each network interface module being connected to one or more respective electrical input ports and one or more respective output ports of one or more of said processing modules.

23. A chassis as defined in claim 22, wherein the network interface modules are line cards.

24. A chassis as defined in claim 21, wherein said interconnection module includes a signal conditioning module peripheral to said switch fabric.

25. A chassis as defined in claim 21, wherein said switch fabric is adapted to provide signal conditioning functionality.

26. A chassis as defined in claim 21, wherein the processing fabric on at least one of said processing modules is adapted to perform packet switching between the electrical input ports and the electrical output ports of said at least one of the processing modules.

27. A chassis as defined in claim 21, wherein said programmable switch fabric implements a fully non-blocking switch.

28. A chassis as defined in claim 21, wherein said programmable switch fabric provides loopback functionality.

29. A chassis as defined in claim 21, further comprising a controller connected to said interconnection module, for providing said connection map to said switch fabric.

30. A chassis as defined in claim 21, wherein said controller is adapted to be controllable from a location remote to the chassis.

31. A method of upgrading a router including a plurality of original chassis, each original chassis comprising a plurality of processing modules and a programmable interconnection module, wherein a data connection exists between each processing module on each original chassis and the interconnection module on the same original chassis and wherein a data connection exists between the interconnection module on each original chassis and at least one interconnection module on respective other original chassis, wherein at least one interconnection module on an original chassis establishes switchable connections between the individual processing modules on its chassis and between at least one processing module on its chassis and at least one interconnection module on another original chassis, the method comprising:

providing at least one additional chassis, each additional chassis comprising a plurality of processing modules and a programmable interconnection module, wherein a data connection exists between each processing module on each additional chassis and the interconnection module on the same additional chassis;

establishing a data connection between an interconnection module on at least one additional chassis and the at least one interconnection module on one of the at least one original chassis;

re-programming the at least one interconnection module on the at least one original chassis that has the switchable connections, such that at least one processing module on its original chassis is connected to the interconnection module on said at least one additional chassis.

32. A method as defined in claim 31, further comprising:
programming the interconnection modules of each additional chassis prior to the step of providing the at least one additional chassis.

33. A method as defined in claim 31, further comprising:
programming the interconnection modules of each additional chassis after the step of providing the at least one additional chassis.

34. A method as defined in claim 31, wherein establishing a data connection between the interconnection module on each additional chassis and the interconnection module on at least one original chassis includes establishing an electrical connection.

35. A method as defined in claim 31, further comprising establishing a data connection between the interconnection module on each additional chassis and the interconnection module on at least one other additional chassis, wherein establishing a data connection between the interconnection module on each additional chassis and the interconnection module on at least one other additional chassis includes establishing an optical connection.

* * * * *